(12) United States Patent
Noguchi et al.

(10) Patent No.: US 11,327,479 B2
(45) Date of Patent: May 10, 2022

(54) VEHICLE CONTROL SYSTEM

(71) Applicant: HONDA MOTOR CO., LTD., Tokyo (JP)

(72) Inventors: Junpei Noguchi, Wako (JP); Masahiro Kowada, Wako (JP); Miki Tsujino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 16/828,205

(22) Filed: Mar. 24, 2020

(65) Prior Publication Data

US 2020/0310410 A1 Oct. 1, 2020

(30) Foreign Application Priority Data

Mar. 29, 2019 (JP) .............................. JP2019-067733

(51) Int. Cl.
*G05D 1/00* (2006.01)
*G05D 1/02* (2020.01)
*B60N 2/00* (2006.01)

(52) U.S. Cl.
CPC ........... *G05D 1/0016* (2013.01); *B60N 2/002* (2013.01); *G05D 1/021* (2013.01)

(58) Field of Classification Search
CPC ............ G05D 1/0016; G05D 1/021; G05D 2201/0213; G05D 1/0022; B60N 2/002; B62D 1/00; B62D 15/0285; B60W 30/06
USPC ............................................................ 701/2
See application file for complete search history.

(56) References Cited

U.S. PATENT DOCUMENTS

| 8,948,931 | B2 * | 2/2015 | Kowada .................. B60R 16/03 340/540 |
| 8,958,929 | B2 | 2/2015 | Okamura et al. |
| 10,974,717 | B2 * | 4/2021 | Golgiri .................. G08G 1/168 |
| 2007/0198145 | A1 * | 8/2007 | Norris .................. G05D 1/0088 701/23 |
| 2013/0311004 | A1 * | 11/2013 | Okamura ............. G05D 1/0033 701/2 |
| 2018/0065665 | A1 * | 3/2018 | Urhahne ............ G06K 9/00798 |
| 2019/0137990 | A1 * | 5/2019 | Golgiri .................. G05D 1/005 |
| 2019/0152472 | A1 * | 5/2019 | Aksyutina ............. B60W 30/06 |
| 2019/0243380 | A1 * | 8/2019 | Lavoie ................. G05D 1/0214 |

(Continued)

FOREIGN PATENT DOCUMENTS

| CN | 108263375 A | * | 7/2018 | ......... B62D 15/0285 |
| JP | 5704178 B2 | | 4/2015 | |
| JP | 2019029691 A | * | 2/2019 | |

*Primary Examiner* — Jonathan M Dager
*Assistant Examiner* — Jean W Charleston
(74) *Attorney, Agent, or Firm* — Armstrong Teasdale LLP

(57) ABSTRACT

A vehicle control system includes: a plurality of terminals configured to be carried by users; and a control device configured to execute remote parking processing to move a vehicle from a current position to a parking position and to park the vehicle at the parking position in response to an instruction from any of the terminals. The control device is configured to execute starting processing to start operation of the vehicle in response to the instruction from any of the terminals. Once the control device executes the starting processing in response to an instruction from one of the terminals, the control device prohibits the remote parking processing in response to an instruction from any other of the terminals as long as the vehicle is in operation.

5 Claims, 6 Drawing Sheets

(56) References Cited

U.S. PATENT DOCUMENTS

2019/0311614 A1* 10/2019 Yang .................... G06V 20/584
2020/0062308 A1* 2/2020 Kim ...................... G08G 1/168

* cited by examiner

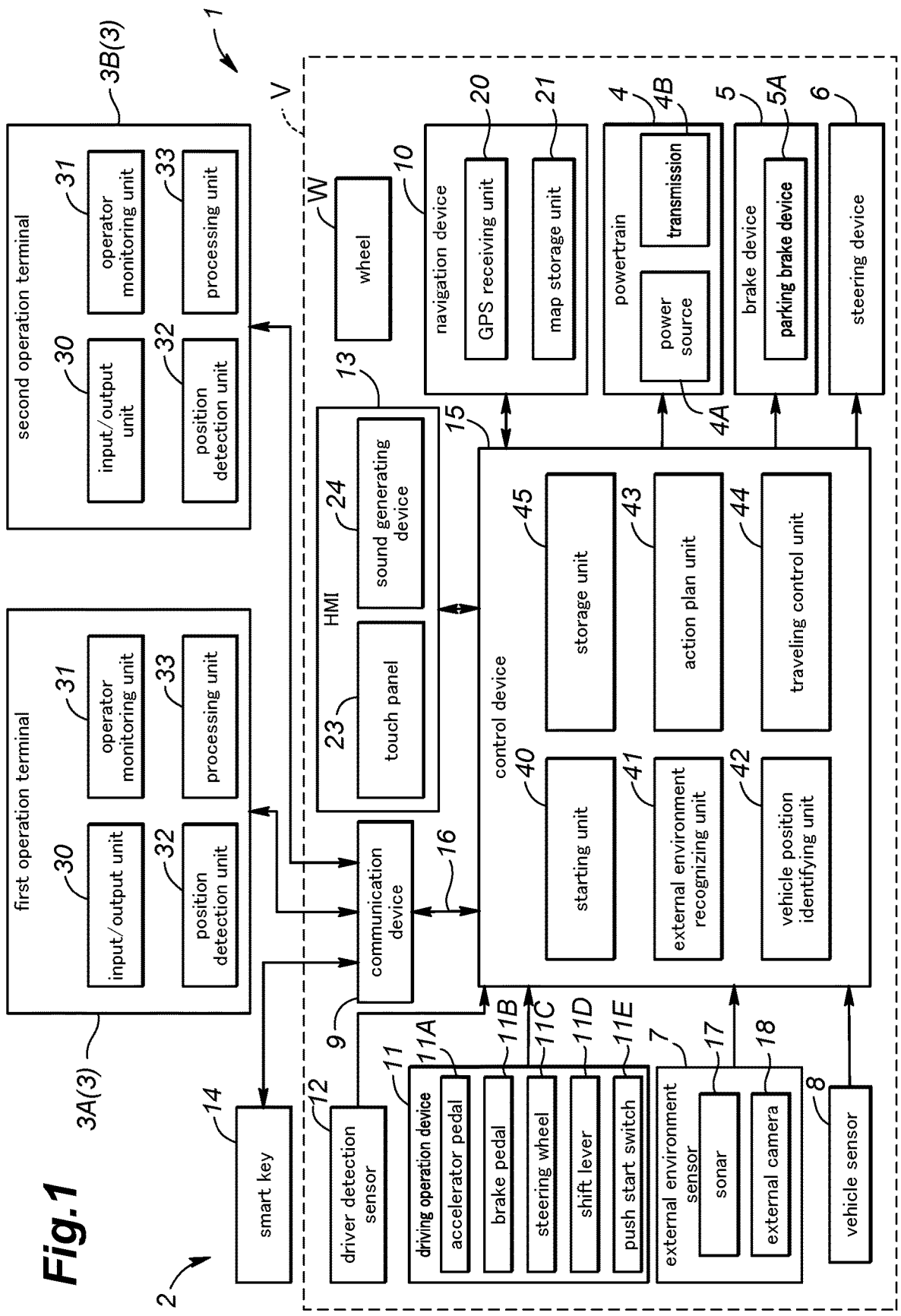

rear ← → front rear ← → front

VEHICLE CONTROL SYSTEM

TECHNICAL FIELD

The present invention relates to a vehicle control system to remotely control a vehicle by a plurality of terminals.

BACKGROUND ART

A known vehicle control device controls a vehicle by a direct operation of the vehicle from inside and by a remote operation of the vehicle by a wireless terminal (for example, Japanese Patent No. 5704178). In this vehicle control device, the direct operation of the vehicle from inside takes priority over the remote operation of the vehicle by the wireless terminal, in a case where instructions resulting from these operations compete with each other.

A vehicle control system to remotely control a vehicle may be provided with a plurality of terminals that can remotely control the vehicle. However, in such a vehicle control system, instructions from the plurality of terminals may compete with each other.

SUMMARY OF THE INVENTION

In view of such a problem of the prior art, a primary object of the present invention is to provide a vehicle control system that can remotely control a vehicle by a plurality of terminals without causing competition of instructions from the terminals.

To achieve such an object, one embodiment of the present invention provides a vehicle control system (1) that includes: a plurality of terminals (3A, 3B) configured to be carried by users; and a control device (15) configured to execute remote parking processing to move a vehicle (V) from a current position to a parking position and to park the vehicle at the parking position in response to an instruction from any of the terminals, wherein the control device is configured to execute starting processing to start operation of the vehicle in response to the instruction from any of the terminals, and once the control device executes the starting processing in response to an instruction from one of the terminals, the control device prohibits the remote parking processing in response to an instruction from any other of the terminals as long as the vehicle is in operation.

According to this arrangement, once the vehicle is started in response to the instruction from the one of the terminals, the control device permits the remote parking processing in response to the instruction from the one of the terminals (namely, the terminal that instructed the vehicle to start) and prohibits the remote parking processing in response to the instruction from any other of the terminals (namely, the terminal other than the one that instructed the vehicle to start), as long as the vehicle is in operation. Thereby, it is possible to prevent the instructions from the terminals from competing with each other.

Preferably, the vehicle control system (1) further includes a driver detection sensor (12) configured to detect that a driver is sitting on a driver's seat, wherein the control device is configured to permit the remote parking processing in a case where the driver detection sensor does not detect that the driver is sitting on the driver's seat.

According to this arrangement, it is possible to prevent a driver from performing a driving operation while the vehicle is moving by a remote operation. Thereby, it is possible to prevent the instruction according to the driving operation from competing with the instruction from the terminal.

Preferably, the control device is configured to prohibit the remote parking processing in response to the instruction from any of the terminals located inside the vehicle.

According to this arrangement, when the vehicle is stopped, the vehicle is prohibited from starting to move according to an operation of the terminal located in the vehicle. Thereby, it is possible to prevent the vehicle from moving against the driver's will.

Preferably, the vehicle control system (1) further includes a driving operation device (11) provided in a vehicle cabin and configured to accept a starting operation of the vehicle by a driver, and once the vehicle is started in response to the starting operation of the vehicle by the driver, the control device permits the remote parking processing in response to the instruction from any of the terminals as long as the vehicle is in operation.

According to this arrangement, once the operation of the vehicle is started in response to the starting operation of the vehicle, the user can perform the remote parking operation to any of the terminals as long as the vehicle is in operation. Thereby, the vehicle control system can be more convenient.

Thus, according to one embodiment of the present invention, it is possible to provide a vehicle control system that can remotely control a vehicle by a plurality of terminals without causing competition of instructions from the plurality of terminals.

BRIEF DESCRIPTION OF THE DRAWINGS

FIG. 1 is a functional block diagram of a vehicle control system according to a first embodiment of the present invention;

DESCRIPTION OF THE PREFERRED EMBODIMENT(S)

Figure 2A:
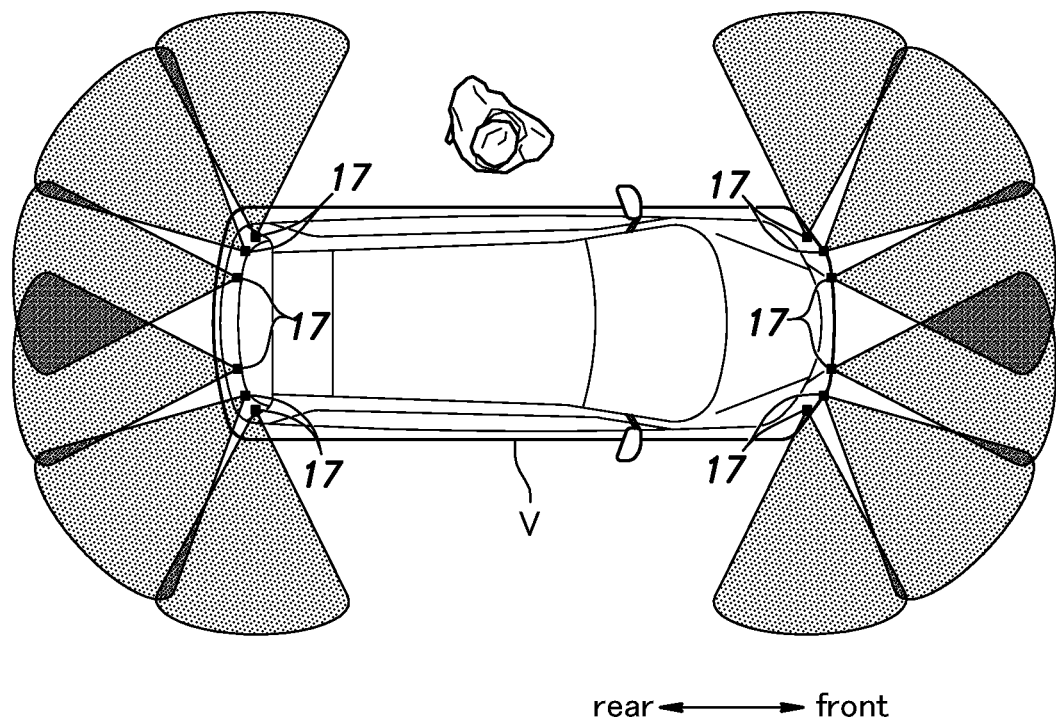
FIG. 2A is a schematic plan view showing sonars provided in a vehicle and detection areas of the sonars.

In the following, a vehicle control system according to embodiments of the present invention is described with reference to the drawings.

First Embodiment

First, a vehicle control system 1 according to a first embodiment is described. As shown in FIG. 1, the vehicle control system 1 includes a vehicle system 2 and a plurality of operation terminals 3. The vehicle system 2 includes a powertrain 4, a brake device 5, a steering device 6, an external environment sensor 7, a vehicle sensor 8, a communication device 9, a navigation device 10, a driving operation device 11, a driver detection sensor 12, an HMI 13, a smart key 14, and a control device 15. The above components of the vehicle system 2 are connected to each other by communication means such as a controller area network 16 (CAN) so that a signal can be transmitted between the above components. The above components of the vehicle system 2 except the smart key 14 are mounted to the vehicle V.

The powertrain 4 is a device that applies a driving force to the vehicle V. The powertrain 4 includes a power source 4A and a transmission 4B, for example. The power source 4A includes at least one of an internal combustion engine such as a gasoline engine and a diesel engine and an electric motor. The brake device 5 is a device that applies a brake force to the vehicle V. For example, the brake device 5 includes a brake caliper that presses a brake pad against a brake rotor and an electric cylinder that supplies an oil pressure to the brake caliper. The brake device 5 includes a parking brake device 5A that restricts rotations of wheels W via wire cables. The steering device 6 is a device for changing a steering angle of the wheels W. For example, the steering device 6 includes a rack-and-pinion mechanism that steers (turns) the wheels W and an electric motor that drives the rack-and-pinion mechanism. The powertrain 4, the brake device 5, and the steering device 6 are controlled by the control device 15.

The external environment sensor 7 is a sensor that detects electromagnetic waves, sound waves, and the like from the periphery of the vehicle V to detect an object outside the vehicle V. The external environment sensor 7 includes sonars 17 and external cameras 18. The external environment sensor 7 may further include a millimeter wave radar or a laser lidar. The external environment sensor 7 outputs a detection result to the control device 15.

Each sonar 17 consists of a so-called ultrasonic sensor. Each sonar 17 emits ultrasonic waves around the vehicle V and captures the ultrasonic waves reflected by the object to detect a position (distance and direction) of the object. As shown in FIG. 2A, a plurality of sonars 17 are provided at a rear part and a front part of the vehicle V, respectively. In the present embodiment, two pairs of sonars 17 are provided on left and right sides of a rear bumper, two pairs of sonars 17 are provided on left and right sides of a front bumper, and one pair of sonars 17 are provided at front and rear ends of each of left and right faces of the vehicle V. That is, the vehicle V is provided with six pairs of sonars in total. In FIG. 2A, detection areas of the sonars 17 are colored. The sonars 17 provided on the rear bumper mainly detect a position of an object behind the vehicle V. The sonars 17 provided on the front bumper mainly detect a position of an object in front of the vehicle V. The sonars 17 provided at the front ends of the left and right faces of the vehicle V detect a position of an object on left and right outsides of the front end of the vehicle V, respectively. The sonars 17 provided at the rear ends of the left and right faces of the vehicle V detect a position of an object on left and right outsides of the rear end of the vehicle V, respectively.

Figure 2B:
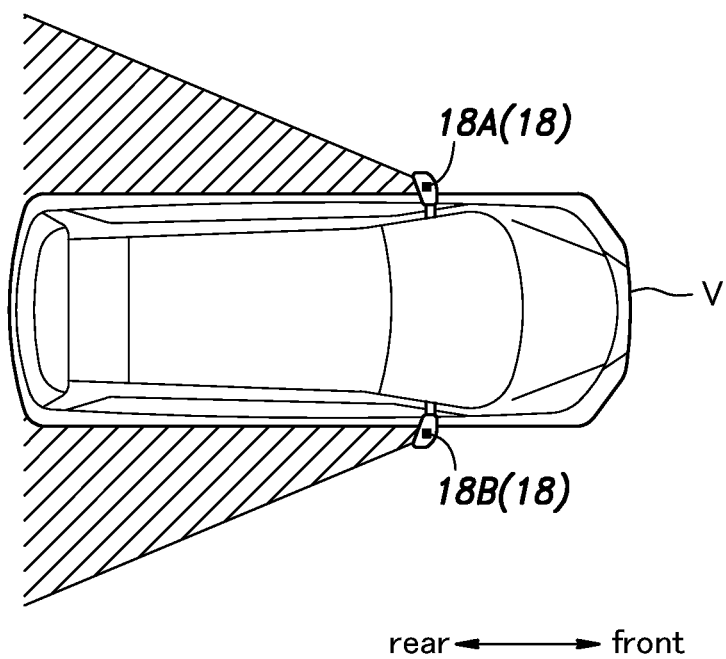
FIG. 2B is a schematic plan view showing door mirror cameras provided in the vehicle and image capturing areas of the door mirror cameras.

The external cameras 18 are devices that capture images around the vehicle V. Each external camera 18 consists of a digital camera using a solid imaging element such as a CCD or a CMOS, for example. The external cameras 18 include a front camera that captures an image of the front of the vehicle V and a rear camera that captures an image of the rear of the vehicle V. As shown in FIG. 2B, the external cameras 18 include a pair of left and right door mirror cameras 18A, 18B that are provided in the vicinity of the door mirrors of the vehicle V to capture images behind left and right sides of the vehicle V. In FIG. 2B, image capturing areas (detection areas) of the door mirror cameras 18A, 18B are hatched. The external cameras 18 may include a pair of left and right pillar cameras provided on center pillars (B pillars) of the vehicle V to capture images of left and right outsides of the vehicle V.

The vehicle sensor 8 includes a vehicle speed sensor that detects the speed of the vehicle V, an acceleration sensor that detects the acceleration of the vehicle V, a yaw rate sensor that detects the angular velocity around a vertical axis of the vehicle V, and a direction sensor that detects the direction of the vehicle V. For example, the yaw rate sensor consists of a gyro sensor.

The communication device 9 mediates (relays) wireless communication between the control device 15 and the operation terminals 3. Thereby, the control device 15 can communicate with the operation terminals 3 carried by users via the communication device 9. The communication device 9 may utilize a known communication method such as infrared communication or Bluetooth (registered trademark), for example.

The navigation device 10 is a device that obtains a current position of the vehicle V and provides route guidance to a destination and the like. The navigation device 10 includes a GPS receiving unit 20 and a map storage unit 21. The GPS receiving unit 20 identifies a position (latitude and longitude) of the vehicle V based on a signal received from an artificial satellite (positioning satellite). The map storage unit 21 consists of a known storage device such as a flash memory or a hard disk, and stores map information.

The driving operation device 11 is provided in a vehicle cabin of the vehicle V and accepts an input operation (driving operation) by the driver (user) to control the vehicle V. The driving operation device 11 includes an accelerator pedal 11A, a brake pedal 11B, a steering wheel 11C, a shift lever 11D, and a push start switch 11E (engine start button). The push start switch 11E accepts a starting operation of the vehicle V (input operation to start operation of the vehicle V) by the driver. The driving operation device 11 may further include an element to activate the parking brake device 5A. The driving operation device 11 includes a sensor that detects an operation amount of the input operation, and outputs a signal indicating the operation amount of the input operation to the control device 15.

The driver detection sensor 12 is a sensor to detect that the driver (user) is sitting on a driver's seat. For example, the driver detection sensor 12 consists of a seat sensor provided on a seat surface of the driver's seat. The seat sensor may consist of a capacitance-type sensor to detect a change in capacitance, or may consist of a membrane-type switch that is turned on when the driver sits on the driver's seat. Alternatively, the driver detection sensor 12 may consist of an indoor camera that captures an image of the driver sitting on the driver's seat. Alternatively, the driver detection sensor 12 may consist of a seat belt sensor to detect that the driver fastens a seat belt of the driver's seat based on information as to whether a tongue of the seat belt is inserted into a buckle thereof. The driver detection sensor 12 outputs a detection result to the control device 15.

The HMI 13 notifies the user of various kinds of information by a display or a voice, and accepts an input operation by the user. For example, the HMI 13 includes a touch panel 23 that accepts the input operation by the user and a sound generating device 24 such as a buzzer and a speaker. The touch panel 23 includes a liquid crystal display, an organic EL display, and the like.

The control device 15 consists of an electronic control device (ECU) that includes a CPU, a nonvolatile memory such as a ROM, a volatile memory such as a RAM, and the like. The CPU executes operation processing according to a program so that the control device 15 executes various types of vehicle control. The control device 15 may be composed of one piece of hardware, or may be composed of a unit including plural pieces of hardware. Further, the functions of the control device 15 may be at least partially executed by hardware such as an LSI, an ASIC, and an FPGA, or may be executed by a combination of software and hardware.

The smart key 14 (FOB key) is a known wireless terminal that can be carried by the user. The smart key 14 can communicate with the control device 15 from outside the vehicle V via the communication device 9. The smart key 14 includes a button to accept input by the user. The user can release a door lock and start the operation of the vehicle V by operating the button of the smart key 14.

Each operation terminal 3 consists of a wireless terminal that can be carried by the user, and can communicate with the control device 15 from outside the vehicle V via the communication device 9. In the present embodiment, each operation terminal 3 consists of a smartphone. A prescribed application is installed on each operation terminal 3 in advance so that each operation terminal 3 can communicate with the control device 15. Each operation terminal 3 is provided with a terminal ID, which is a prescribed numerical value to identify each operation terminal 3.

As shown in FIG. 1, each operation terminal 3 includes an input/output unit 30, an operator monitoring unit 31, a position detection unit 32, and a processing unit 33.

The input/output unit 30 provides information to the user operating each operation terminal 3, and accepts input by the user operating each operation terminal 3. The input/output unit 30 consists of a touch panel, for example. When the input/output unit 30 accepts the input by the user, the input/output unit 30 outputs a signal corresponding to the input to the processing unit 33.

The operator monitoring unit 31 is a unit that captures an image of the user operating each operation terminal 3. The operator monitoring unit 31 consists of a digital camera using a solid imaging element such as a CMOS, for example. The operator monitoring unit 31 is provided at a position to capture an image of a face including eyes of the user performing the input to the input/output unit 30.

The position detection unit 32 obtains positional information of each operation terminal 3. The position detection unit 32 may obtain the positional information of each operation terminal 3 by receiving a signal from a geodetic satellite (GPS satellite), for example. Alternatively, the position detection unit 32 may obtain information about a position of each operation terminal 3 relative to the vehicle V by communicating with the control device 15 via the communication device 9. The position detection unit 32 outputs the obtained positional information of each operation terminal 3 to the processing unit 33.

The processing unit 33 sends the control device 15 the signal from the input/output unit 30, the image of the user captured by the operator monitoring unit 31, and the positional information of each operation terminal 3 obtained by the position detection unit 32. Also, when the processing unit 33 receives a signal from the control device 15, the processing unit 33 processes the signal from the control device 15 and makes the input/output unit 30 provide information to the user operating each operation terminal 3. The input/output unit 30 may provide the information to the user by displaying the information thereon, for example.

The control device 15 can start the operation of the vehicle V (namely, the driving of the powertrain 4) based on a signal from each operation terminal 3. Also, the control device 15 can move the vehicle V to a prescribed position and park the vehicle V there based on a signal from each operation terminal 3. To control the vehicle V at this time, the control device 15 at least includes a starting unit 40, an external environment recognizing unit 41, a vehicle position identifying unit 42, an action plan unit 43, a traveling control unit 44, and a storage unit 45.

The starting unit 40 executes authentication of the smart key 14 based on a signal from the push start switch 11E included in the driving operation device 11. Also, the starting unit 40 determines whether the smart key 14 is located in the vehicle V. In a case where the authentication of the smart key 14 succeeds and the starting unit 40 determines that the smart key 14 is located inside the vehicle V, the starting unit 40 starts the driving of the powertrain 4 (namely, the starting unit 40 starts the operation of the vehicle V). Also, in a case where the control device 15 receives a signal that instructs a start of the operation of the vehicle V from one of the operation terminals 3, the starting unit 40 executes authentication of the one of the operation terminals 3. In a case where the authentication of the one of the operation terminals 3 succeeds, the starting unit 40 starts the driving of the powertrain 4 (namely, the starting unit 40 starts the operation of the vehicle V). In a case where the powertrain 4 includes an internal combustion engine, the starting unit 40 turns on an ignition device when the starting unit 40 starts the driving of the powertrain 4.

The external environment recognizing unit 41 recognizes an obstacle (for example, a parked vehicle or a wall) located around the vehicle V based on the detection result of the external environment sensor 7, and thereby obtains information about the obstacle. Further, the external environment recognizing unit 41 analyzes an image captured by the external cameras 18 based on a known image analysis method such as pattern matching, and thereby determines whether the obstacle is present and obtains the size of the obstacle in a case where the obstacle is present. Further, the external environment recognizing unit 41 may compute a distance to the obstacle based on signals from the sonars 17 to obtain the position of the obstacle.

The vehicle position identifying unit 42 identifies the position of the vehicle V based on a signal from the GPS receiving unit 20 of the navigation device 10. Further, the vehicle position identifying unit 42 may obtain the vehicle speed and yaw rate of the vehicle V from the vehicle sensor 8, in addition to the signal from the GPS receiving unit 20, to identify the position and posture of the vehicle V by so-called inertial navigation.

The external environment recognizing unit 41 analyzes the detection result of the external environment sensor 7 (more specifically, the images captured by the external cameras 18) based on a known image analysis method such as pattern matching, and thereby recognizes a position of a white line on a road surface of a parking area, for example.

The traveling control unit 44 controls the powertrain 4, the brake device 5, and the steering device 6 based on a traveling control instruction from the action plan unit 43 to make the vehicle V travel.

The storage unit 45 consists of a RAM and the like, and stores information necessary for executing processing of the action plan unit 43 and the traveling control unit 44.

When the HMI 13 or each operation terminal 3 accepts an input by the user, the action plan unit 43 computes a trajectory (traveling route) of the vehicle V and outputs the traveling control instruction to the traveling control unit 44, if necessary.

Figure 3:
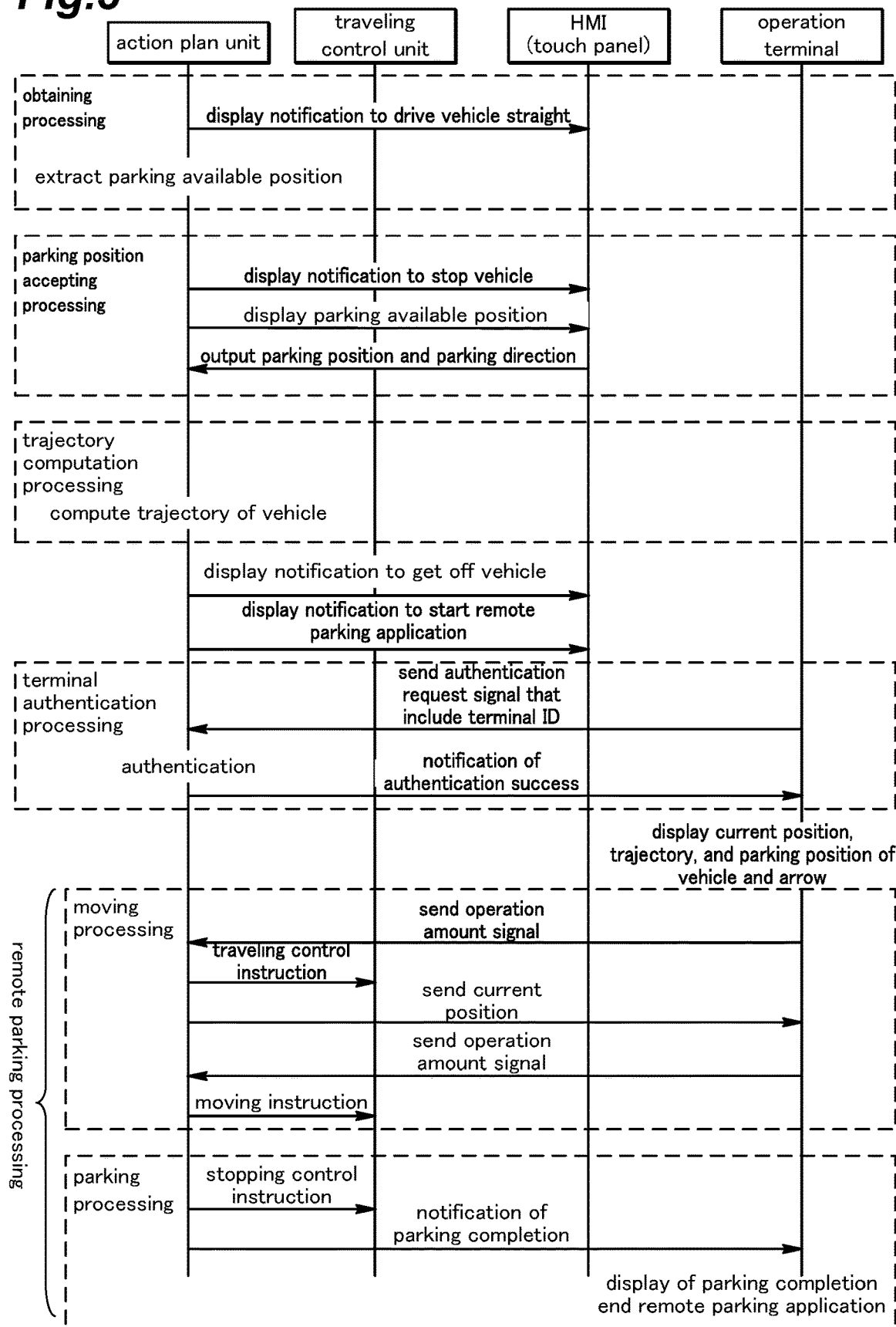
FIG. 3 is a sequence diagram of parking assist processing.

After the vehicle V has stopped, the action plan unit 43 executes parking assist processing, when the user performs an input corresponding to desire for parking assistance by a remote operation. In the following, the parking assist processing will be described with reference to a sequence diagram of FIG. 3.

First, the action plan unit 43 executes obtaining processing to obtain at least one space to park the vehicle V (hereinafter referred to as "parking available position"). Specifically, the action plan unit 43 makes the touch panel 23 of the HMI 13 display a notification that instructs the driver to drive the vehicle V straight. While the driver is driving the vehicle V straight, the action plan unit 43 obtains the position and size of the obstacle and the position of the white line on the road surface based on the signal from the external environment sensor 7. The action plan unit 43 extracts the at least one parking available position based on the position and size of the obstacle and the position of the white line.

Next, the action plan unit 43 executes parking position accepting processing to accept a selection of a position to park the vehicle V (hereinafter referred to as "parking position") from the at least one parking available position. More specifically, the action plan unit 43 makes the touch panel 23 display a notification that instructs the user to stop the vehicle V, in a case where the action plan unit 43 extracts the at least one parking available position in the above obtaining processing. At this time, the action plan unit 43 may make the touch panel 23 also display a notification that instructs the user to change a position of the shift lever 11D to the parking position after the vehicle V has stopped.

Next, the action plan unit 43 makes the touch panel 23 display the current position of the vehicle V and the at least one parking available position. At this time, the action plan unit 43 may make the touch panel 23 display the current position of the vehicle V and the at least one parking available position on the image obtained by the external cameras 18. Thereafter, the action plan unit 43 makes the touch panel 23 display a notification that instructs the user to select the parking position from the at least one parking available position. When the user inputs a desired parking position to the touch panel 23, the touch panel 23 outputs a signal corresponding to the inputted parking position to the action plan unit 43. At this time, the action plan unit 43 may identify the desired parking position based on a position where the user touches the touch panel 23. At this time, the action plan unit 43 makes the touch panel 23 display a button for the user to select a parking direction (a forward parking direction or a backward parking direction). At this time, the action plan unit 43 may simply compute a pair of routes from the current position of the vehicle V to the parking position such that each route corresponds to the forward parking direction or the backward parking direction, and may make the touch panel 23 display the pair of routes. In such a case, the touch panel 23 may permit the user to select the parking direction by touching one of the pair of routes, and may output the selection result (namely, selected parking direction) to the action plan unit 43.

Next, when the action plan unit 43 receives the parking position inputted by the user from the touch panel 23, the action plan unit 43 executes trajectory computation processing to compute a trajectory of the vehicle V from the current position to the parking position. In a case where the user performs the input to select the parking direction, the action plan unit 43 may compute the trajectory of the vehicle V based on not only the current position and the parking position but also the parking direction selected by the user.

When the computation of the trajectory of the vehicle V is completed, the action plan unit 43 makes the touch panel 23 display a notification that urges the user to get off the vehicle V and a notification that instructs the user to start dedicated application software for the remote parking processing (hereinafter referred to as "remote parking application") in each operation terminal 3. According to these notifications, the user gets off the vehicle V, and then starts the remote parking application in each operation terminal 3.

Thereafter, the input/output unit 30 of each operation terminal 3 displays an input button to connect each operation terminal 3 to the vehicle V and to start the authentication of each operation terminal 3. When the user operates (for example, touches or pushes) the input button, each operation terminal 3 is connected to the vehicle V and the action plan unit 43 executes terminal authentication processing to execute the authentication of each operation terminal 3 connected to the vehicle V. In the terminal authentication processing, each operation terminal 3 sends the action plan unit 43 an authentication request signal that includes the terminal ID of each operation terminal 3, and the action plan unit 43 executes the authentication (determination) of each operation terminal 3 based on the terminal ID of each operation terminal 3. When the action plan unit 43 succeeds in the authentication of each operation terminal 3, the action plan unit 43 sends a signal to notify authentication success to each operation terminal 3, and then the input/output unit 30 of each operation terminal 3 displays the current position, trajectory, and parking position of the vehicle V and a vertical arrow. Thereby, the user can instruct the action plan unit 43 to execute the remote parking processing by performing the input to the input/output unit 30 of each operation terminal 3. The remote parking processing includes moving processing to move the vehicle V from the current position to the parking position and parking processing to park the vehicle V at the parking position.

When the user swipes (operates) the vertical arrow displayed on the input/output unit 30 of each operation terminal 3, each operation terminal 3 sends an operation amount signal corresponding to a swipe amount (operation amount) of the vertical arrow to the action plan unit 43. The action plan unit 43 converts the operation amount signal into a moving amount of the vehicle V and executes the moving processing to move the vehicle V along the trajectory by the computed moving amount until the vehicle V reaches the parking position. In the moving processing, the action plan unit 43 sends the traveling control instruction to the traveling control unit 44, and sends the current position of the vehicle V to each operation terminal 3.

During this moving processing, the action plan unit 43 determines whether the vehicle V has reached the parking position. When the action plan unit 43 determines that the vehicle V has reached the parking position, the action plan unit 43 executes the parking processing to park the vehicle V. In this parking process, the action plan unit 43 first sends a stopping control instruction to the traveling control unit 44 to activate the brake device 5. Thereafter, the action plan unit 43 activates the parking brake device 5A. When the parking processing is completed, the action plan unit 43 sends a notification of parking completion, which indicates that the parking processing has been completed, to each operation terminal 3.

When each operation terminal 3 receives the notification of parking completion, the input/output unit 30 of each operation terminal 3 displays a notification to indicate that the parking of the vehicle V has been completed, and each operation terminal 3 ends the remote parking application. Thereby, the parking assist processing is completed.

The vehicle control system 1 according to the present embodiment includes a plurality of operation terminals 3 and the control device 15, and the action plan unit 43 of the control device 15 determines whether each operation terminal 3 is appropriate for the remote operation of the vehicle V in the terminal authentication processing.

Figure 5D:
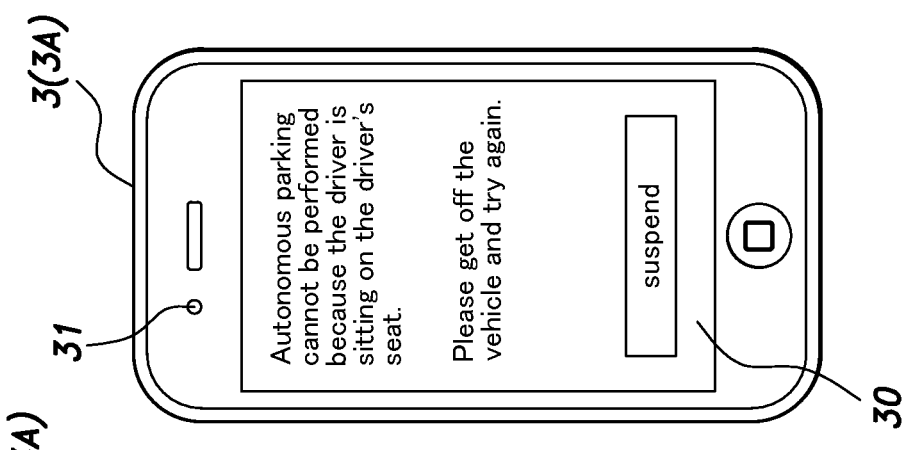
FIG. 5D is an explanatory diagram showing the screen display in a case where a first operation condition is not satisfied.
Figure 5C:
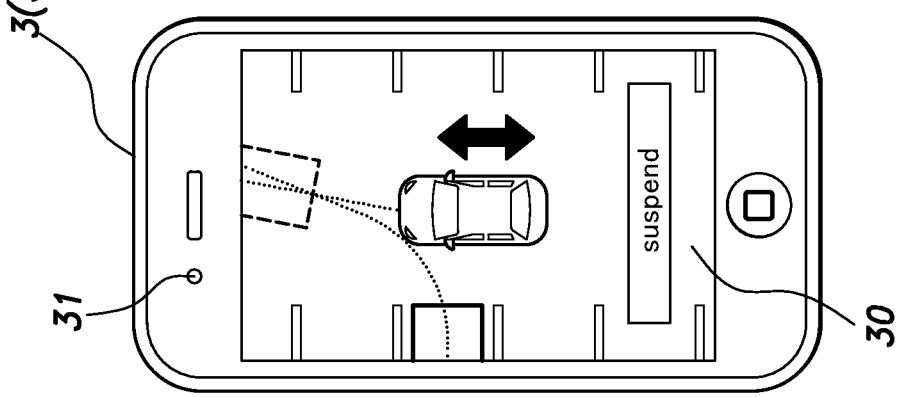
FIG. 5C is an explanatory diagram showing the screen display during moving processing.
Figure 5B:
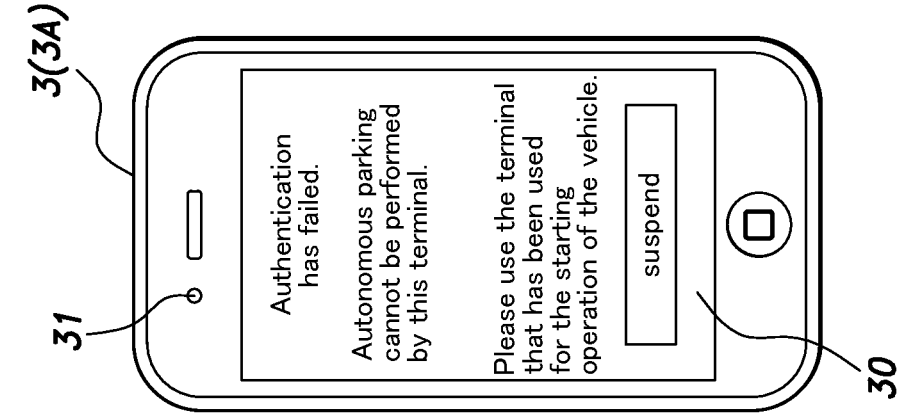
FIG. 5B is an explanatory diagram showing the screen display in a case where the terminal authentication fails.
Figure 5A:
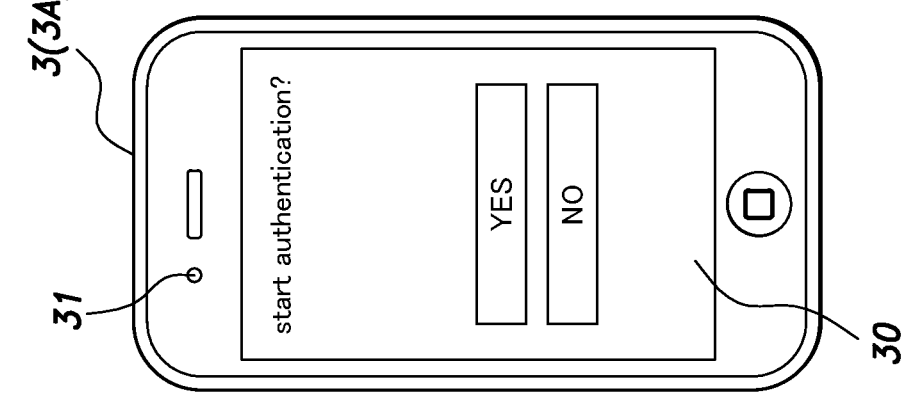
FIG. 5A is an explanatory diagram showing a screen display of a touch panel of an operation terminal before terminal authentication is executed.

Specifically, after the above parking position accepting processing, the action plan unit 43 makes the touch panel 23 display a notification that urges the user to get off the vehicle V and a notification that instructs the user to start the above remote parking application in each operation terminal 3. According to these notifications, the user gets off the vehicle V and then starts the remote parking application in each operation terminal 3. Thereafter, as shown in FIG. 5A, the input/output unit 30 of each operation terminal 3 displays a button (hereinafter referred to as "authentication start button") to receive an input to start the authentication of each operation terminal 3. When the user operates (for example, touches or pushes) the authentication start button (when the user performs the input to start the authentication of each operation terminal 3), the processing unit 33 sends the action plan unit 43 an authentication request signal that includes the position of each operation terminal 3 and the terminal ID of each operation terminal 3.

When the action plan unit 43 receives the authentication request signal, the action plan unit 43 executes the terminal authentication processing. In the terminal authentication processing, the action plan unit 43 executes the authentication of each operation terminal 3 by comparing the terminal ID of each operation terminal 3 included in the authentication request signal with a starting terminal ID stored in the storage unit 45. The starting terminal ID identifies the operation terminal 3 that is appropriate for the remote operation of the vehicle V. The starting terminal ID is stored in the storage unit 45 in starting processing to start the driving of the powertrain 4 (namely, to start the operation of the vehicle V). In the following, the starting processing will be described.

In the starting processing, in a case where the operation of the vehicle V is started in response to an instruction from one of the operation terminals 3, the terminal ID of the one of the operation terminals 3 is stored in the RAM (volatile memory) of the storage unit 45 as the starting terminal ID. On the other hand, in a case where the operation of the vehicle V is started in response to the starting operation of the vehicle V (namely, the operation of the push start switch 11E) by the user, the starting unit 40 sets the starting terminal ID to a manual ID, which is a prescribed numerical value different from any terminal ID. Incidentally, when the starting unit 40 receives a signal from the push start switch 11E to indicate that the push start switch 11E is operated, the starting unit 40 may obtain the position of the smart key 14, and may start the operation of the vehicle V in a case where the starting unit 40 determines that the smart key 14 is located inside the vehicle V. The starting terminal ID is not changed as long as the vehicle V is in operation (namely, as long as the driving of the powertrain 4 is maintained without being stopped). The data in the RAM including the starting terminal ID is deleted when the operation of the vehicle V is stopped. Also, in a case where the starting unit 40 starts the operation of the vehicle V in response to a signal indicating that the button of the smart key 14 is operated, the starting unit 40 sets the starting terminal ID to the manual ID.

Figure 4:
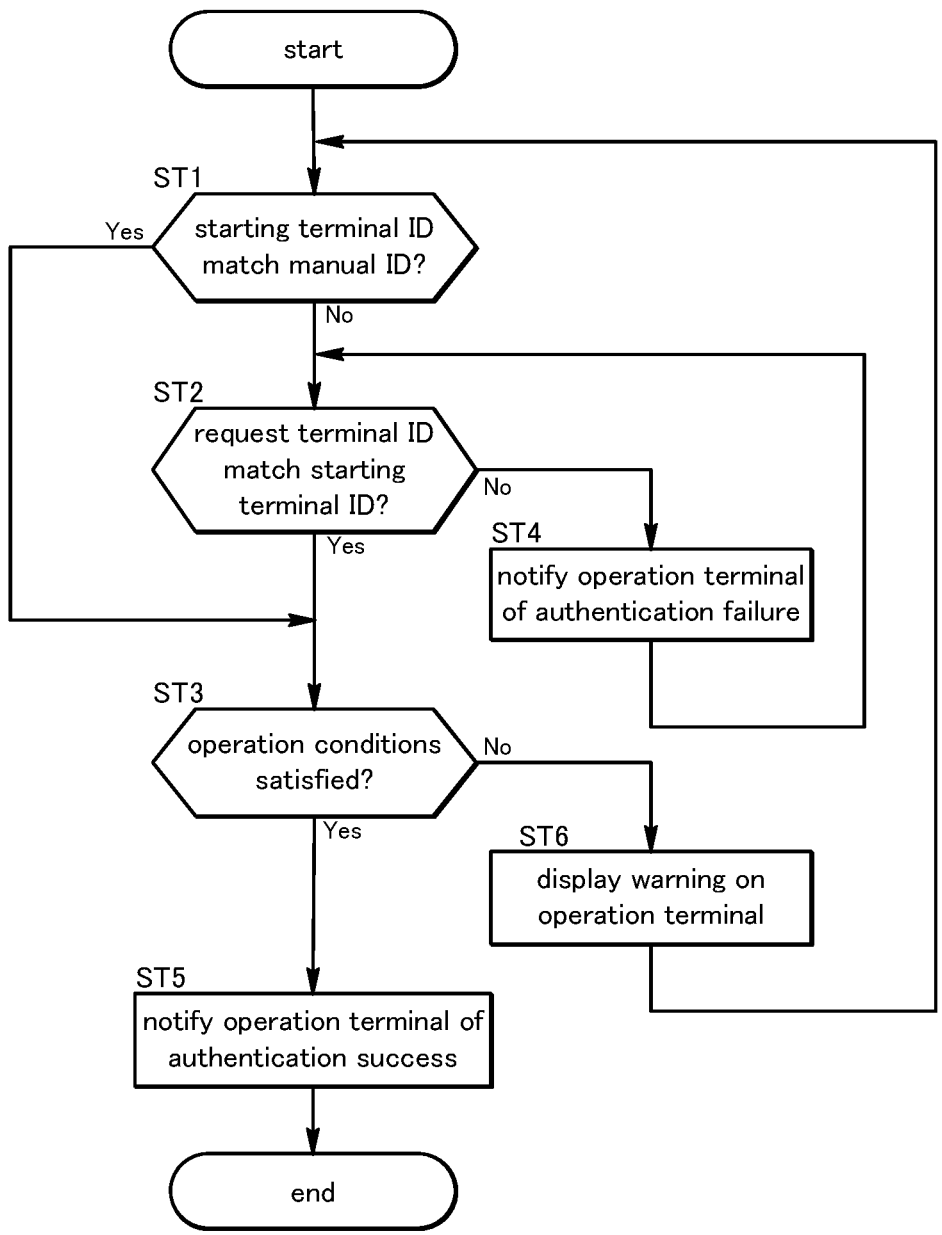
FIG. 4 is a flow chart of terminal authentication processing.

Next, details of the terminal authentication processing executed by the action plan unit 43 will be described with reference to FIG. 4.

In step ST1 (the first step of the terminal authentication processing), the action plan unit 43 obtains the starting terminal ID stored in the storage unit 45, and determines whether the starting terminal ID matches the manual ID (whether the starting terminal ID is the same as the manual ID). In a case where the action plan unit 43 determines that the starting terminal ID does not match the manual ID, the action plan unit 43 executes step ST2. In a case where the action plan unit 43 determines that the starting terminal ID matches the manual ID, the action plan unit 43 executes step ST3.

In step ST2, the action plan unit 43 obtains the terminal ID of each operation terminal 3 included in the authentication request signal (hereinafter referred to as "request terminal ID"). Next, the action plan unit 43 determines whether the request terminal ID matches the starting terminal ID. In a case where the action plan unit 43 determines that the request terminal ID matches the starting terminal ID, the action plan unit 43 executes step ST3. In a case where the action plan unit 43 determines that the request terminal ID does not match the starting terminal ID, the action plan unit 43 executes step ST4.

In step ST3, the action plan unit 43 determines whether each operation terminal 3 and the vehicle V satisfy prescribed conditions (hereinafter referred to as "operation conditions"), based on the position of each operation terminal 3 included in the authentication request signal and the detection result of the driver detection sensor 12. In the present embodiment, the operation conditions include a first operation condition and a second operation condition.

The first operation condition is a condition that the driver (user) is not sitting on the driver's seat. The action plan unit 43 determines whether the first operation condition is satisfied (whether the driver is sitting on the driver's seat) based on the detection result of the driver detection sensor 12. The action plan unit 43 determines that the first operation condition is satisfied in a case where the driver detection sensor 12 does not detect that the driver is sitting on the driver's seat, and determines that the first operation condition is not satisfied in a case where the driver detection sensor 12 detects that the driver is sitting on the driver's seat.

The second operation condition is a condition that the vehicle V is not traveling. For example, the action plan unit 43 obtains the vehicle speed from the vehicle sensor 8. The action plan unit 43 determines that the second operation condition is satisfied (the vehicle V is not traveling) in a case where the vehicle speed is zero, and determines that the second operation condition is not satisfied (the vehicle V is traveling) in a case where the vehicle speed is not zero. Alternatively, the action plan unit 43 may determine that the second operation condition is not satisfied (the vehicle V is traveling) in a case where the shift lever 11D is not located in a parking position or a rotational speed of each wheel W is equal to or more than a prescribed value.

The action plan unit 43 determines that the operation conditions are satisfied in a case where both of the first and second operation conditions are satisfied, i.e. in a case where the driver is not sitting on the driver's seat and the vehicle V is not traveling. The action plan unit 43 determines that the operation conditions are not satisfied in a case where at least one of the first and second operation conditions are not satisfied. The action plan unit 43 executes step ST5 in a case where the operation conditions are satisfied, and executes step ST6 in a case where the operation conditions are not satisfied.

In step ST4, the action plan unit 43 sends a failure signal to each operation terminal 3 to which the request terminal ID belongs (each operation terminal 3 from which the authentication request signal is sent). The failure signal is a signal to notify each operation terminal 3 of the authentication failure. In a case where each operation terminal 3 receives the failure signal, the processing unit 33 makes the input/output unit 30 display a notification to indicate that the authentication has failed, as shown in FIG. 5B. Thereafter, each operation terminal 3 ends the remote parking application.

In step ST5, the action plan unit 43 sends a success signal and vehicle information to each operation terminal 3 to which the request terminal ID belongs (each operation terminal 3 from which the authentication request signal is sent). The success signal is a signal to notify each operation terminal 3 of the authentication success. The vehicle information is information about the current position, trajectory, and parking position of the vehicle V. As shown in FIG. 5C, the processing unit 33 creates a schematic plan view of the current position, trajectory, and parking position of the vehicle V based on the vehicle information received by each operation terminal 3, and makes the input/output unit 30 display the schematic plan view together with the vertical arrow. Thereafter, the action plan unit 43 executes the remote parking processing in response to the instruction from each operation terminal 3 to which the action plan unit 43 sends the success signal.

In step ST6, the action plan unit 43 sends an unsatisfied signal to each operation terminal 3 to which the request terminal ID belongs (each operation terminal 3 from which the authentication request signal is sent). The unsatisfied signal is a signal to notify that the operation conditions are not satisfied. At this time, the action plan unit 43 may send not only the unsatisfied signal but also information about a specific operation condition that is not satisfied. When each operation terminal 3 receives the unsatisfied signal, the processing unit 33 makes the input/output unit 30 display a screen (warning) to notify that the operation conditions are not satisfied. In a case where each operation terminal 3 receives the information about the specific operation condition that is not satisfied, the processing unit 33 may make the input/output unit 30 display information indicating the specific operation condition that is not satisfied. For example, as shown in FIG. 5D, in a case where the first operation condition is not satisfied, the input/output unit 30 displays a notification to inform that the driver is sitting on the driver's seat and to instruct the driver to get off the vehicle V. Thereafter, as shown in FIG. 5A, the input/output unit 30 may display the authentication start button again. When the action plan unit 43 completes sending the unsatisfied signal to each operation terminal 3 to which the request terminal ID belongs, the action plan unit 43 returns to step ST1.

Next, the operation and effect of the vehicle control system 1 having the above configuration is described. In the present embodiment, the vehicle control system 1 includes a pair of operation terminals 3 (a first operation terminal 3A and a second operation terminal 3B).

When the user gives an instruction to start the operation of the vehicle V by using the first operation terminal 3A, the starting unit 40 executes the starting processing to start the driving of the powertrain 4 (namely, to start the operation of the vehicle V). In the starting processing, the storage unit 45 stores the terminal ID of the first operation terminal 3A as the starting terminal ID, and the driving of the powertrain 4 is started so that the operation of the vehicle V is started. Once the operation of the vehicle V is started, the starting terminal ID is not changed as long as the vehicle V is in operation (namely, as long as the driving of the powertrain 4 is maintained without being stopped).

When the vehicle V stops and the user performs an input corresponding to desire for remote parking to the HMI 13, the parking assist processing is executed. In the parking assist processing, when the driver gets off the vehicle V with the first operation terminal 3A, starts the remote parking application, and operates the authentication start button, the terminal authentication processing is executed. In the terminal authentication processing, the authentication success of the first operation terminal 3A is notified to the first operation terminal 3A (step ST5), because the starting terminal ID does not match the manual ID (step ST1), the terminal ID of the first operation terminal 3A (namely, the request terminal ID) matches the starting terminal ID (step ST2), the driver is not sitting on the driver's seat, and the vehicle V is not traveling (step ST3). Therefore, the driver can perform the remote parking by using the first operation terminal 3A.

In the parking assist processing, when the driver gets off the vehicle V with the second operation terminal 3B and operates the authentication start button, the terminal authentication processing is executed. In the terminal authentication processing, the authentication failure of the second operation terminal 3B is notified to the second operation terminal 3B and the remote parking application is ended (step ST4), because the terminal ID of the second operation terminal 3B (namely, the request terminal ID) does not match the starting terminal ID (step ST2). Therefore, the driver cannot perform the remote parking by using the second operation terminal 3B.

As described above, in step ST2 of the terminal authentication processing, the terminal ID of each operation terminal 3 that has sent the authentication request signal is compared with the starting terminal ID to determine whether the operation terminal 3 that has sent the authentication request signal matches the operation terminal 3 that has given an instruction to start the operation of the vehicle V, and the authentication of each operation terminal 3 succeeds only in a case where the former matches the latter. Accordingly, once the starting processing to start the operation of the vehicle V is executed in response to the instruction from one of the operation terminals 3, the parking assist processing (specifically, the remote parking processing) in response to the instruction from any other of the operation terminals 3 (namely, the operation terminal 3 other than the one that has given the instruction to start the operation of the vehicle V) is prohibited, as long as the vehicle V is in operation. Thereby, the parking assist processing can be executed only in response to the instruction from the one of the operation terminals 3 (namely, the one operation terminal 3 that has given the instruction to start the operation of the vehicle V). Accordingly, it is possible to prevent the instructions from the operation terminals 3 from competing with each other.

Also, in step ST3 of the terminal authentication processing, whether each operation terminal 3 and the vehicle V satisfy the operation conditions is determined, and the authentication of each operation terminal 3 succeeds only in a case where each operation terminal 3 and the vehicle V satisfy the operation conditions. The operation conditions include the first condition that the driver is not sitting on the driver's seat, and the remote parking processing can be executed in a case where the driver detection sensor 12 does not detect that the driver is sitting on the driver's seat. Accordingly, it is possible to prevent the driver from performing a driving operation to the driving operation device 11 while the vehicle V is moving by the remote operation. Thereby, it is possible to prevent the instruction from each operation terminal 3 from competing with the instruction according to the driving operation by the driver.

After the operation of the vehicle V stops completely, in a case where the driver starts the operation of the vehicle V by using a device other than the operation terminals 3 (for example, the push start switch 11E of the driving operation device 11 or the smart key 14) and then the parking assist processing is executed, the starting terminal ID matches the manual ID. Thereafter, when the driver gets off the vehicle V with the first operation terminal 3A and operates the authentication start button, the terminal authentication processing is executed. In the terminal authentication processing, the authentication success is notified to the first operation terminal 3A (step ST5), because the starting terminal ID is set to the manual ID (step ST1), the driver is not sitting on the driver's seat, and the vehicle V is not traveling (step ST3). Similarly, in a case where the driver gets off the vehicle V with the second operation terminal 3B and then the terminal authentication processing is executed, the authentication success of the second operation terminal 3B is notified to the second operation terminal 3B. As described above, once the operation of the vehicle V is started in response to the operation of the device other than the operation terminals 3, the remote parking processing can be executed by using any of the operation terminals 3 as long as the vehicle V is in operation. Thereby, the driver can perform the remote parking of the vehicle V by using any of the operation terminals 3, so that the vehicle control system 1 can be more convenient.

Second Embodiment

Figure 6:
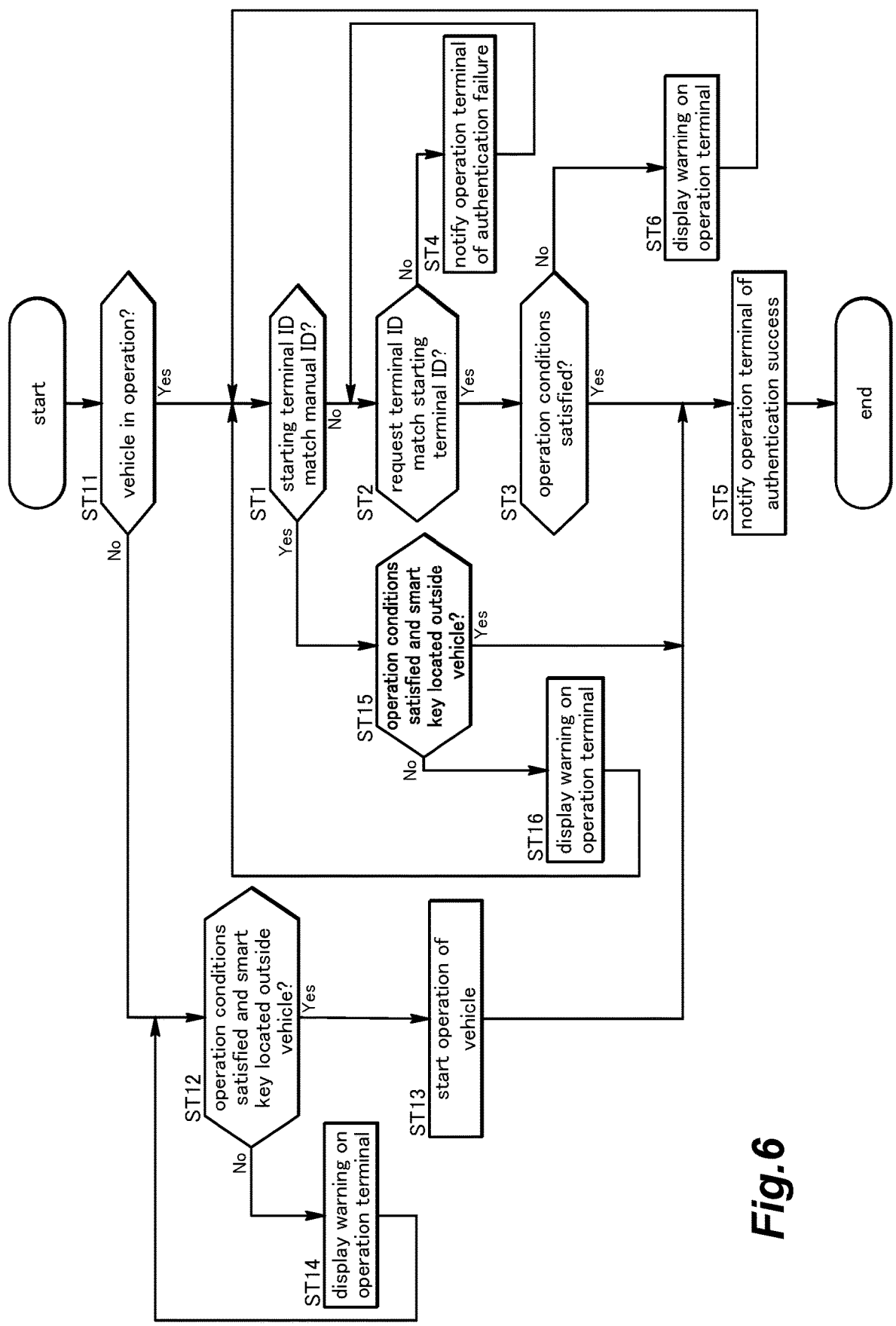
FIG. 6 is a flow chart of terminal authentication processing according to a second embodiment of the present invention.

As shown in FIG. 6, the vehicle control system 101 according to the second embodiment is different from the vehicle control system 1 according to the first embodiment in step ST1 of the terminal authentication processing. Further, the vehicle control system 101 according to the second embodiment is different from the vehicle control system 1 according to the first embodiment in that steps ST11 to ST16 are added to the terminal authentication processing. The other steps of the terminal authentication processing are the same as those in the first embodiment, and therefore the descriptions thereof are omitted. In the second embodiment, after the vehicle V stops, the control device 15 deletes the starting terminal ID stored in the RAM and is in a standby state to wait for a signal from each operation terminal 3 or the smart key 14.

In step ST11 (the first step of the terminal authentication processing), the action plan unit 43 determines whether the vehicle V is in operation. At this time, the action plan unit 43 may determine that the vehicle V is in operation in a case where the powertrain 4 is driven, and determine that the vehicle V is not in operation in a case where the powertrain 4 is not driven. In a case where the action plan unit 43 determines that the vehicle V is in operation, the action plan unit 43 executes step ST1. In a case where the action plan unit 43 determines that the vehicle V is not in operation, the action plan unit 43 executes step ST12.

In step ST1, the action plan unit 43 determines whether the starting terminal ID matches the manual ID (whether the starting terminal ID is the same as the manual ID). In a case where the action plan unit 43 determines that the starting terminal ID matches the manual ID, the action plan unit 43 executes step ST15. In a case where the action plan unit 43 determines that the starting terminal ID does not match the manual ID, the action plan unit 43 executes step ST2, similar to the first embodiment.

In step ST12, the action plan unit 43 communicates with the smart key 14 to obtain information as to whether the smart key 14 is located inside the vehicle V. Thereafter, the action plan unit 43 determines whether the operation conditions (for example, the first and second operation conditions) are satisfied and the smart key 14 is located outside the vehicle V. The action plan unit 43 executes step ST13 in a case where the operation conditions are satisfied and the smart key 14 is located outside the vehicle V. Otherwise, the action plan unit 43 executes step ST14.

In step ST13, the action plan unit 43 starts the operation of the vehicle V. Specifically, the action plan unit 43 drives the powertrain 4. Further, the action plan unit 43 may record the request terminal ID as the starting terminal ID. When the action plan unit 43 completes starting the operation of the vehicle V, the action plan unit 43 executes step ST5.

In step ST14, the action plan unit 43 sends the processing unit 33 a signal notifying that the operation conditions are not satisfied or the smart key 14 is located inside the vehicle V. For example, when the processing unit 33 receives a signal notifying that the smart key 14 is located inside the vehicle V, the processing unit 33 makes the input/output unit 30 display a notification (warning) informing the user that the smart key 14 is located inside the vehicle V and urging the user to carry the smart key 14 out of the vehicle V. Thereafter, the action plan unit 43 executes step ST12.

In step ST15, the action plan unit 43 communicates with the smart key 14 to obtain information as to whether the smart key 14 is located inside the vehicle V. Thereafter, the action plan unit 43 determines whether the operation conditions (for example, the first and second operation conditions) are satisfied and the smart key 14 is located outside the vehicle V. The action plan unit 43 executes step ST5 in a case where the operation conditions are satisfied and the smart key 14 is located outside the vehicle V. Otherwise, the action plan unit 43 executes step ST16.

In step ST16, the action plan unit 43 sends the processing unit 33 a signal notifying that the operation conditions are not satisfied or the smart key 14 is located inside the vehicle V. For example, when the processing unit 33 receives a signal notifying that the smart key 14 is located inside the vehicle V, the processing unit 33 makes the input/output unit 30 display a notification (warning) informing the user that the smart key 14 is located inside the vehicle V and urging the user to carry the smart key 14 out of the vehicle V. Thereafter, the action plan unit 43 executes step ST1.

In the following, the operation of the vehicle control system 101 having the above configuration is described. For example, the action plan unit 43 makes the touch panel 23 display a notification urging the user to get off the vehicle V and a notification instructing the user to start the remote parking application in each operation terminal 3. Thereby, the user gets off the vehicle V and starts the remote parking application in each operation terminal 3, after the user stops the driving of the powertrain 4.

Thereafter, the input/output unit 30 of each operation terminal 3 displays the authentication start button, and when the user operates the authentication start button, each operation terminal 3 sends the authentication request signal to the action plan unit 43. When the action plan unit 43 receives the authentication request signal from each operation terminal 3, the action plan unit 43 executes the terminal authentication processing with reference to the terminal ID of each operation terminal 3. In the terminal authentication processing, the action plan unit 43 determines whether each operation terminal 3 is appropriate for the remote operation of the vehicle V.

When the terminal authentication processing is executed in the above situation, the action plan unit 43 first determines that the vehicle V is not in operation because the powertrain 4 is not driven (step ST11). Thereafter, the action plan unit 43 determines whether the operation conditions are satisfied and the smart key 14 is located outside the vehicle V (step ST12). In a case where the operation conditions are satisfied and the smart key 14 is located outside the vehicle V, the action plan unit 43 starts the operation of the vehicle V (step ST13), and notifies the processing unit 33 of the authentication success (step ST5). Thereafter, the user can move and park the vehicle V by using the operation terminal 3 from which the authentication request signal is sent. As described above, even in a case where the user stops the driving of the powertrain 4, the operation of the vehicle V is started thereafter, so that the vehicle V can be moved and parked by the remote operation. Therefore, the vehicle control system 1 can be more convenient.

In step ST1 of the terminal authentication processing, the action plan unit 43 determines whether the starting terminal ID matches the manual ID. In a case where the starting terminal ID matches the manual ID (for example, in a case where the operation of the vehicle V has been started by the operation of the push start button), the action plan unit 43 notifies the processing unit 33 of the authentication success (step ST5), when the operation conditions are satisfied and the smart key 14 is located outside the vehicle V (step ST15). Thereby, it is possible to prevent the smart key 14 from being left in the vehicle V after the vehicle V is parked. Also, when the action plan unit 43 determines that the smart key 14 is located inside the vehicle V (step ST15), the input/output unit 30 displays a notification (warning) informing the user that the smart key 14 is located inside the vehicle V. Thereby, it is possible to prevent the smart key 14 from being left in the vehicle V after the vehicle V is parked.

Concrete embodiments of the present invention have been described in the foregoing, but the present invention should not be limited by the foregoing embodiments and various modifications and alterations are possible within the scope of the present invention. Although the vehicle system 2 includes one smart key 14 in the above embodiments, the present invention is not limited to these embodiments. For example, the vehicle system 2 may include plural smart keys 14 in other embodiments. In a case where the vehicle system 2 includes plural smart keys 14, when the starting unit 40 starts the operation of the vehicle V in response to a signal from one of the smart keys 14, the starting unit 40 may set the starting terminal ID to the manual ID regardless of the smart key 14 from which the signal is sent. Also, in a case where the vehicle system 2 includes plural smart keys 14, the action plan unit 43 may execute step ST13 (or step ST5) of the terminal authentication processing, when the action plan unit 43 determines that the operation conditions are satisfied and all the smart keys 14 are located outside the vehicle V in step ST12 (or step ST15) of the terminal authentication processing.

In the second embodiment, the terminal ID of each operation terminal 3 may be stored in the storage unit 45 in advance, and in the terminal authentication processing, the action plan unit 43 may execute a step to compare the request terminal ID and the terminal ID stored in the storage unit 45 before step ST11. In such a case, the action plan unit 43 may execute step ST11 in a case where the terminal ID stored in advance matches the request terminal ID, otherwise the action plan unit 43 may notify the processing unit 33 of the authentication failure. Thereafter, the processing unit 33 may make the input/output unit 30 notify the user of the authentication failure, and then ends the remote parking application.

The operation conditions are not limited to the first and second operation conditions. For example, the operation conditions may include a third operation condition that the distance between each operation terminal 3 and the vehicle V is equal to or less than a prescribed value (for example, 6 m). In such a case, the action plan unit 43 may determine that the operation conditions are satisfied in a case where all of the first to third operation conditions are satisfied, and determine that the operation conditions are not satisfied in a case where at least one of the first to third operation conditions are not satisfied. Also, the action plan unit 43 may determine whether the driver is on board based on the opening/closing of a door provided in the vehicle V, and may determine that the first operation condition is satisfied in a case where the driver is not on board, and determine that the first operation condition is not satisfied in a case where the driver is on board. Also, the control device 15 may prohibit the remote parking processing in response to the instruction from any of the operation terminals 3 located inside the vehicle V. Accordingly, when the vehicle V is stopped, the vehicle V is prohibited from starting to move according to an operation of the operation terminal 3 located in the vehicle V. Thereby, it is possible to prevent the vehicle V from moving against the driver's will.

The invention claimed is:

1. A vehicle control system, comprising:
    a plurality of terminals configured to be carried by users;
    a control device configured to execute remote parking processing to move a vehicle from a current position to a parking position and to park the vehicle at the parking position in response to an instruction from any of the terminals; and
    a key terminal to release a door lock of the vehicle and to allow the users to start operation of the vehicle,
    wherein the control device is configured to execute starting processing to start operation of the vehicle in response to the instruction from any of the terminals and determines whether the key terminal is located outside the vehicle,
    wherein once the control device executes the starting processing in response to an instruction from one of the terminals, the control device prohibits the remote parking processing in response to an instruction from any other of the terminals if the key terminal is located outside the vehicle, and
    wherein the control device sends the one terminal a signal notifying that the key terminal is located inside the vehicle if the key terminal is located inside the vehicle.

2. The vehicle control system according to claim 1, further comprising a driver detection sensor configured to detect that a driver is sitting on a driver's seat, wherein the control device is configured to permit the remote parking processing in a case where the driver detection sensor does not detect that the driver is sitting on the driver's seat.

3. The vehicle control system according to claim 1, wherein the control device is configured to prohibit the remote parking processing in response to an instruction from any of the terminals located inside the vehicle.

4. The vehicle control system according to claim 1, further comprising a driving operation device provided in a vehicle cabin and configured to accept a starting operation of the vehicle by a driver, and once the operation of the vehicle is started in response to the starting operation of the vehicle by the driver, the control device permits the remote parking processing in response to the instruction from any of the terminals as long as the vehicle is in operation.

5. The vehicle control system according to claim 1, wherein once the control device executes the starting processing in response to an instruction from one of the terminals, the control device prohibits the remote parking processing in response to the instruction from the any other of the terminals if the key terminal is located outside the vehicle in case that the vehicle is not in operation or in case that the vehicle is started in response to a starting operation of the vehicle that does not involve the terminals, and wherein the control device sends the one terminal a signal notifying that the key terminal is located inside the vehicle if the key terminal is located inside the vehicle in case that the vehicle is not in operation or in case that the vehicle is started in response to the starting operation of the vehicle that does not involve the terminals.

\* \* \* \* \*